United States Patent [19]

Shimaoka et al.

[11] Patent Number: 5,652,422

[45] Date of Patent: Jul. 29, 1997

[54] CARD READER/WRITER

[75] Inventors: Hitoshi Shimaoka; Shinji Arase, both of Kumamoto, Japan

[73] Assignee: Matsushita Electric Industrial Co., Ltd., Osaka, Japan

[21] Appl. No.: 454,731

[22] Filed: May 31, 1995

[30] Foreign Application Priority Data

Jun. 1, 1994 [JP] Japan .................. 6-120114
Jan. 1, 1995 [JP] Japan .................. 7-003261

[51] Int. Cl.⁶ .................................................. G06K 13/00
[52] U.S. Cl. .................................... 235/475; 235/384
[58] Field of Search ............................. 235/384, 475

[56] References Cited

U.S. PATENT DOCUMENTS

| | | |
|---|---|---|
| 3,501,622 | 3/1970 | Weir et al. ................. 235/384 |
| 3,900,715 | 8/1975 | James ....................... 235/384 |
| 3,958,103 | 5/1976 | Oka et al. .................. 235/384 |
| 3,984,660 | 10/1976 | Oka et al. .................. 235/384 |
| 4,357,530 | 11/1982 | Roes et al. ................. 235/384 |
| 4,684,792 | 8/1987 | Nickels, Jr. ................ 235/384 |
| 5,434,404 | 7/1995 | Liu et al. ................... 235/384 |
| 5,461,219 | 10/1995 | Cronvall .................... 235/384 |

*Primary Examiner*—Harold Pitts
*Attorney, Agent, or Firm*—McDermott, Will & Emery

[57] ABSTRACT

Upper unit and lower unit are jointed with a hinge to form a body, and a card transfer path is provided between the units, and a recording/reproducing head and an image forming head are installed separated in the units opposing to each other, for making the maintenance servicing easy. In addition, a handle and elastic clamping components are provided on one of the units, and accepting components to accept the clamping components on the other unit, in order to make the clamping of both units in closed state firm and the open/close operation easy.

7 Claims, 6 Drawing Sheets

CARD READER/WRITER

BACKGROUND OF THE INVENTION

The present invention relates to a card reader/writer for recording/reproducing data on a card like an ID card, a prepaid card, etc.

The use of ID cards and prepaid cards has become a popular practice. An ordinary card reader/writer houses within its body a transfer device to transfer magnetic card and a write/read means to record and read out magnetic data for recording and reproducing data on a magnetic card by means of magnetic head; where, a magnetic card is inserted from an inserting slit located at the front of body, and the writing/reading on the magnetic card is conducted while the magnetic card is transferred within the body.

Figure 6:
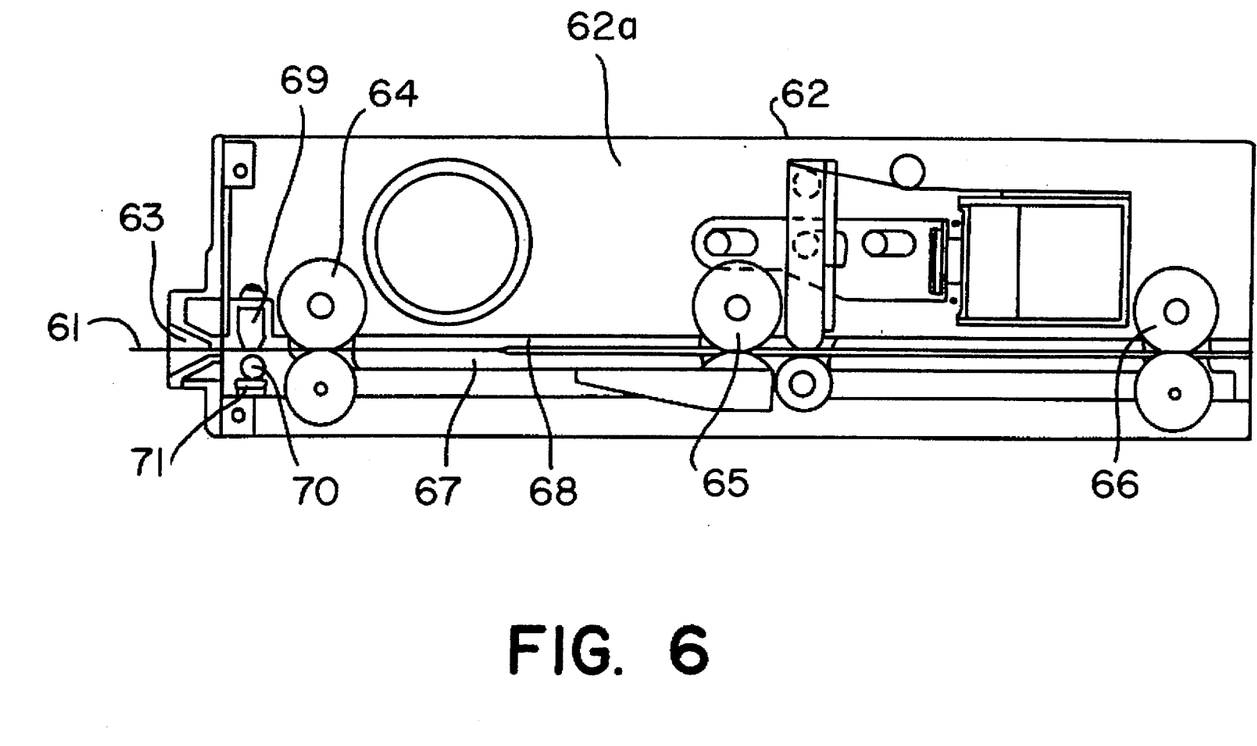
FIG. 6 is side view (cross section) showing the inside of a conventional card reader/writer.

FIG. 6 is side view of a conventional magnetic card reader/writer showing the cross section of its inside. In FIG. 6, 61 denotes a magnetic card, 62 a body, 62a a chassis of the body. At the front of the body 62 is an inserting slit 63 to accept the magnetic card 61, inside the body are transfer rollers 64, 65, 66 to transfer the magnetic card 61. Between the transfer rollers 64, 65, 66 are bases 67 and base covers 68 installed horizontally providing a small separation in between for guiding the magnetic card 61. At the inside of the inserting slit 63 are a blade 69 and a movable tubular component 70 installed restraining the magnetic card 61 from the upper and lower sides; the movable tubular component 70 is pushed up by a leaf spring 71 to have contact with the blade 69. When the magnetic card 61 is inserted to the inserting slit 63, the movable component 70 is pushed down by the magnetic card 61 for the thickness thereof. The up-down stroke of the movable component 70 is restricted to accept only a single leaf of magnetic card to avoid plurality of cards being inserted overlaid.

In a conventional constitution as described above, however, as the constituent components are installed on a single chassis most sections of the body 62 need to be disassembled when exchanging the blade 69 with a different version having different dimensions in order to comply with a specific thickness of cards to be handled, or when cleaning the card transfer rollers 64, 65, 66, or such other occasions; doing such component replacing work or maintenance servicing at a place where a card reader/writer is on duty is a difficult and troublesome issue with the prior art setup.

SUMMARY OF THE INVENTION

The purpose of the present invention is to implement a card reader/writer comprising rollers for card transfer and a head for recording/reproducing data, wherein the constituent elements of a body are separated in an upper unit and a lower unit, the upper unit and the lower unit are jointed with a hinge to be made openable/closable to each other, and a card transfer path and recording/reproducing means for recording/reproducing data on card are provided between the two units.

DESCRIPTION OF THE PREFERRED EMBODIMENTS

Figure 1A:
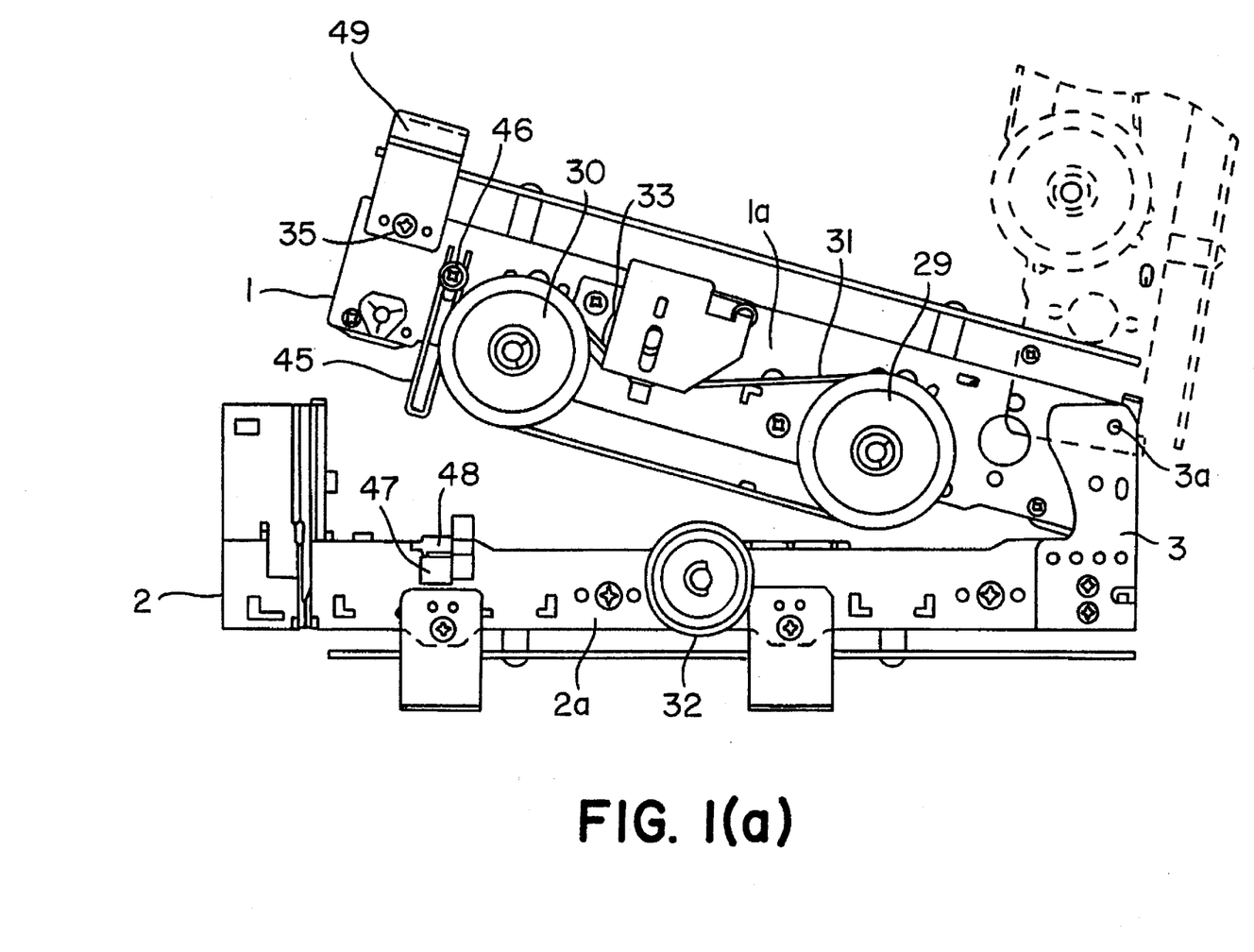
FIG. 1(a) shows side view of a card reader/writer, an embodiment of the present invention, with the upper unit open.
Figure 1B:
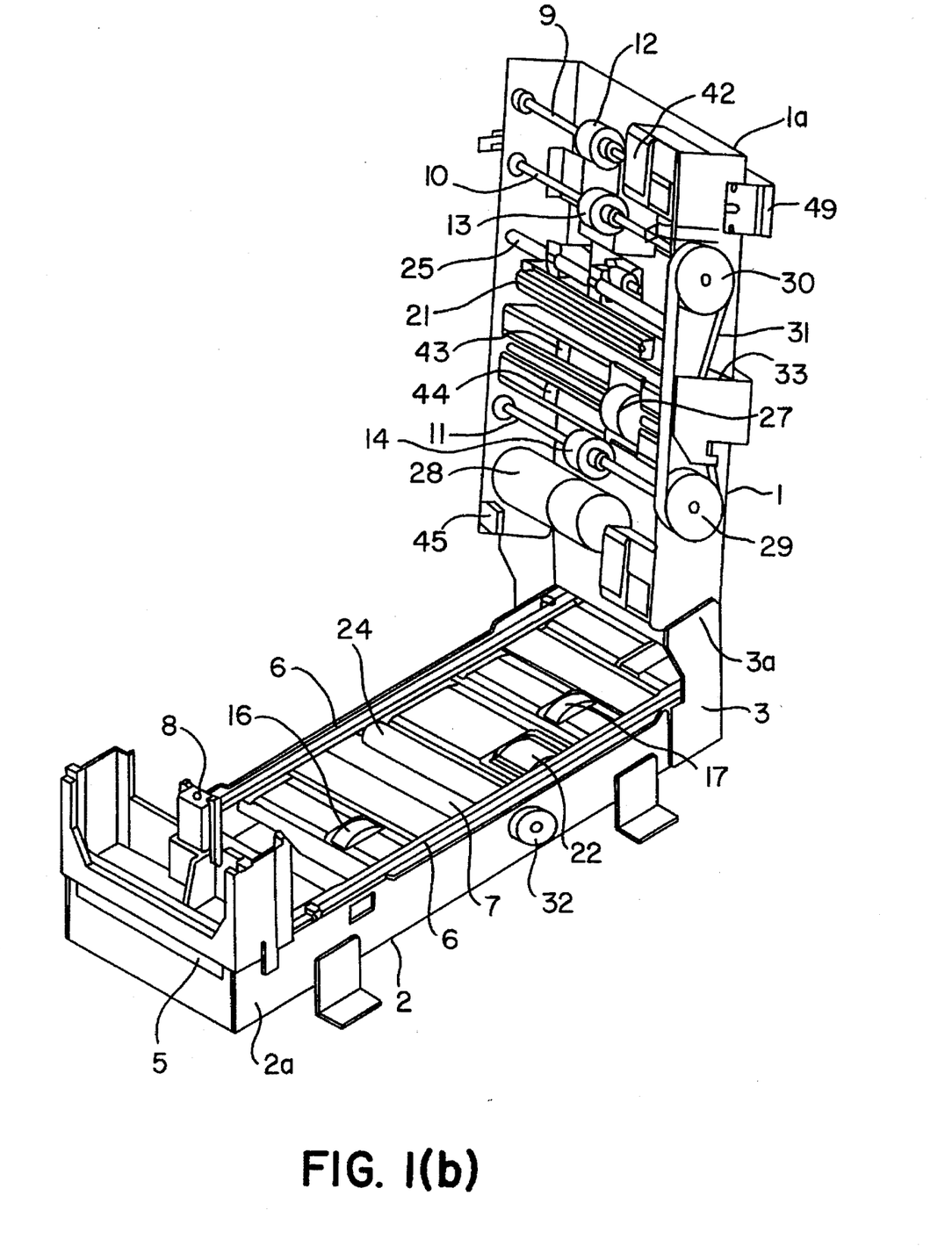
FIG. 1(b) is perspective view of the above.
Figure 1C:
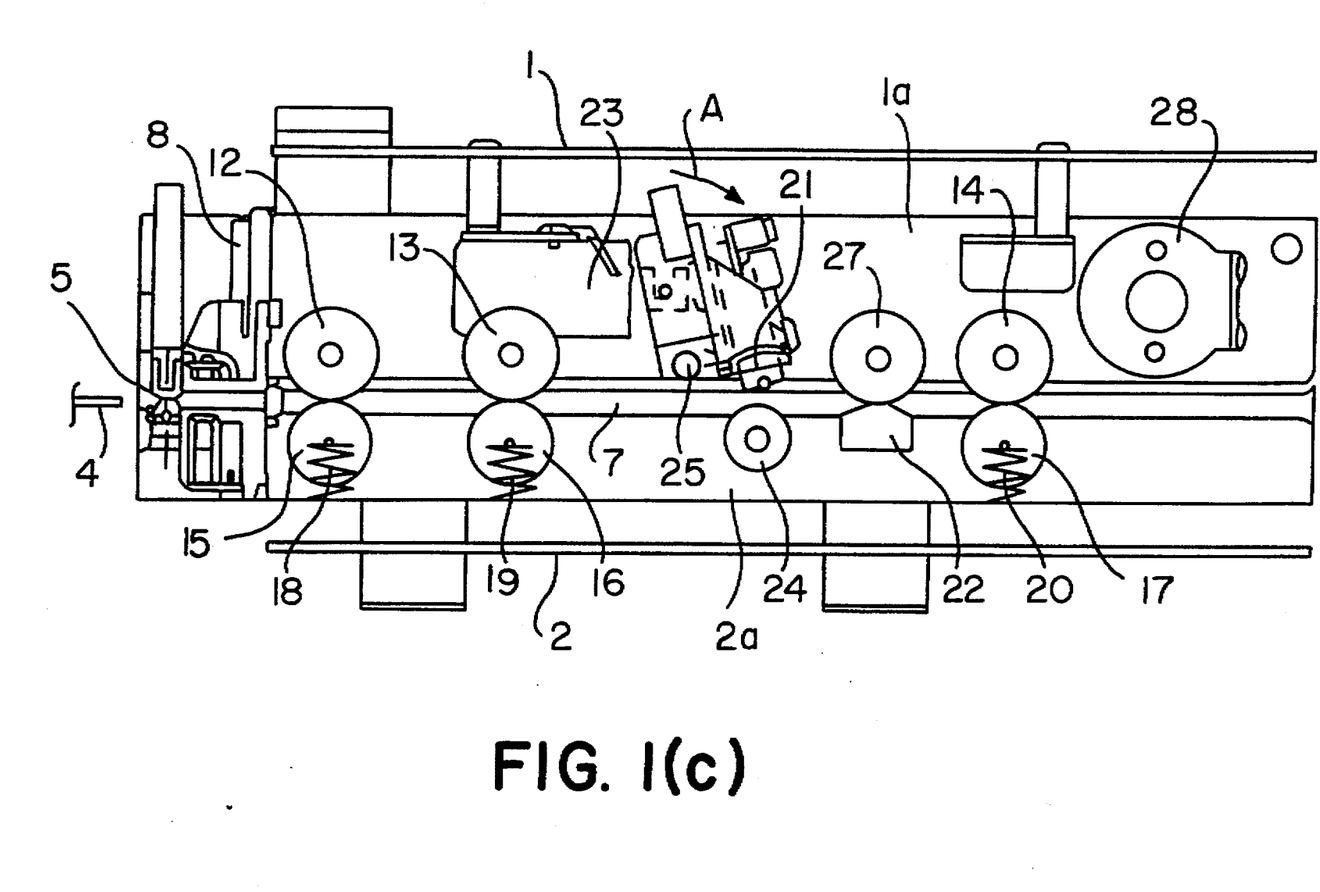
FIG. 1(c) is side view of the inside, when the units are closed.

In FIG. 1(a), (b), (c), 1 denotes an upper unit, 2 a lower unit, 1a an upper chassis forming the base structure of the upper unit 1, 2a a lower chassis forming the base structure of the lower unit 2; the two units are jointed revolvable with a pin 3a of hinge 3 as axis. At the front end of the lower chassis 2a is an inserting slit 5 to accept a magnetic card 4, and the magnetic card 4 inserted from the inserting slit 5 moves in guided at its both sides by a pair of guides 6, cross section of which has ⊃ shape, installed on the left and right sides of the lower chassis 2a. Namely, a transfer path 7 for the magnetic card 4 is formed between the pair of guides 6.

In the vicinity of the inserting slit 5 is a pin shutter 8. The pin shutter 8 is actuated by a signal; when the pin is extruding in the transfer path 7 the magnetic card 4 is not allowed to come inside, when the pin is withdrawn from the transfer path 7 the magnetic card 4 is accepted to come into.

There are revolving shafts 9,10,11 installed on the upper chassis 1a, on each of the revolving shafts 9,10 and 11 driving rollers 12,13 and 14 are fixed, respectively, therefore, when the revolving shafts 9,10,11 revolve the driving rollers 12,13,14 also revolve.

There are pressure rollers 15,16,17 in the lower chassis 2a; each of the pressure rollers 15,16 and 17 is pushed upward by springs 18,19 and 20, respectively, to come in contact with the driving rollers 12,13 and 14.

There is a thermal print 21 installed on the upper chassis 1a, and a magnetic head 22 in the lower chassis 2a. By the work of solenoid 23 in the upper chassis 1a, the thermal print 21 is put in contact with or withdrawn from a platen roller 24 installed revolvable in the lower chassis 2a. Namely, by controlling the solenoid 23, the thermal print 21 is rotated in the direction of an arrow A with a fixing axis 25 as the centre to make contact with the platen roller 24, or rotated in the other direction to be separated from the platen roller 24.

The magnetic head 22 is pushed upward by a spring or the like elastic component (not shown) to have contact with a roller 27 installed revolvable in the upper chassis 1a.

There is a motor 28 on the upper chassis 1a to give revolution to the driving rollers 12,13,14 and the platen roller 24.

Pulleys 29 and 30 are fixed, respectively, to revolving shafts 11 and 10 to revolve together.

There is a belt 31 between the pulley 29 and pulley 30, and the belt 31 comes in contact with a pulley 32 when the upper chassis 1a and the lower chassis 2a are in closed state. The pulley 32 is fixed with the platen roller 24; when the pulley 32 revolves the platen roller 24 revolves together. Tension roller 33 touches with a force to the belt 31 to give a tension to the belt 31.

Figure 2:
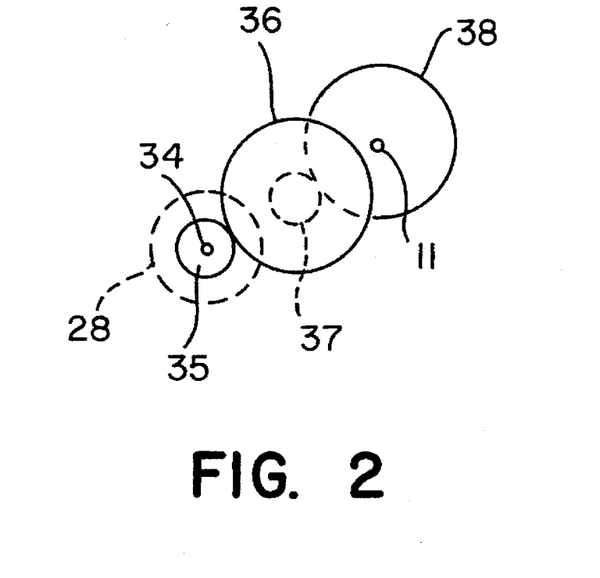
FIG. 2 illustrates the essential part of torque transmission mechanism from a motor, side view.

As shown in FIG. 2, the motor 28 has a shaft 34, and a pinion gear 35 at the end of the shaft 34. The pinion gear 35 is geared to a reduction gear 36 installed revolvable in the upper chassis 1a, a smaller gear 37 of the reduction gear 36 is geared to a gear 38. The gear 38 is fixed on the other end of the revolving shaft 11 opposite to the pulley 29.

Figure 3:
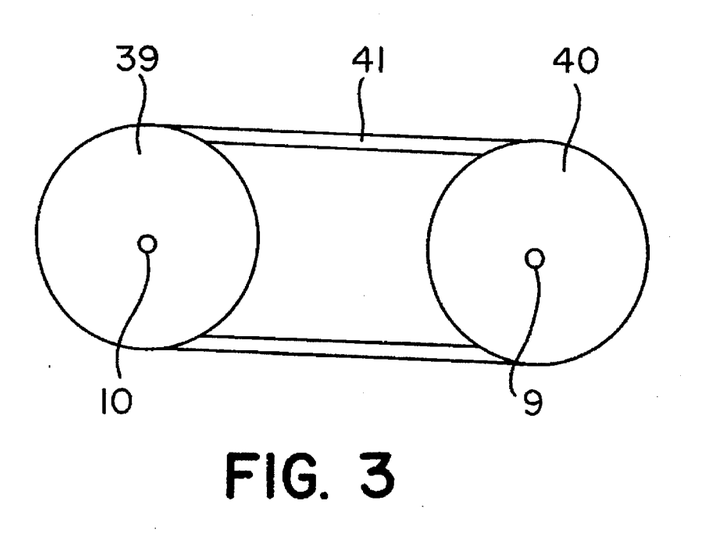
FIG. 3 illustrates the essential part of torque transmission mechanism to a driving roller, side view.

As shown in FIG. 3, on one end of the revolving shaft 10 opposite to the pulley 30 is fixed a pulley 39, and at the end of the revolving shaft 9 is a pulley 40 fixed in the same side as the pulley 39. The pulley 39 and the pulley 40 are bridged with a belt 41.

Now in the following, how driving force of the motor 28 is conveyed when the upper chassis 1a and the lower chassis 2a are, in closed state is described.

The torque of motor 28 is conveyed to the reduction gear 36 via the pinion gear 35, and to the gear 38. As the gear 38 is fixed to the revolving shaft 11, the shaft 11 revolves along with the gear 38, so do the driving roller 14 and the pulley 29 which are fixed to the revolving shaft 11. When the pulley 29 revolves the pulley 30 and the pulley 32 receive the torque via the belt 31. When the pulley 32 revolves the platen roller 24 also revolves; when the pulley 30 revolves the revolving shaft 10 fixed to the pulley 30 also revolves. When the shaft 10 revolves the driving roller 13 and the pulley 39 also revolve. When the pulley 39 revolves the belt 41 conveys the torque to the pulley 40 to give a revolution to the pulley 40; the revolving shaft 9 also revolves together to give a revolution to the driving roller 12. In this way, the revolution of the motor 28 is conveyed to the driving rollers 12,13,14 and the platen roller 24 to cause revolution of the same direction so as to transfer a magnetic card; therefore, the magnetic card 4 can be transferred within the facilities in accordance with the direction of revolution of the motor 28.

In the vicinity of the card inserting slit 5 of the upper chassis 1a, a sensor 42 is installed. Sensor 43 and sensor 44 are installed immediately before and after the roller 27, moreover, another sensor 45 at the rear end of the facilities. The photo sensor or the like is used as the sensors of the above mentioned installation.

Now, with the above mentioned constitution, operation of the card reader/writer is described.

Upon receiving a signal from outside allowing to accept a card, a pin provided in the pin shutter 8 retracts from the transfer path 7 to allow insertion of a card. If the magnetic card 4 is inserted from the inserting slit 5 the sensor 42 detects the magnetic card 4 inserted, and actuates the motor 28. As a result of the revolution of motor 28 the driving roller 12 starts revolving, and the magnetic card 4 is pulled into the facilities by being pressed between the driving roller 12 and the pressure roller 15. After the magnetic card 4 is pulled into by the driving roller 12, it is pulled by the driving roller 13 to be transferred further inside. During the above procedure, the magnetic card 4 proceeds in the transfer path 7 while guided at its both sides by a pair of guides. While the card is being pulled to further inside by the driving roller 13 it passes on the magnetic head 22; when, the magnetic head 22 conducts at least one of the operations, either recording of data on or reproduction of data from recording medium part of the magnetic card 4. And then the magnetic card 4 is taken further inside by the driving roller 14. The distance between the driving roller 13 and the driving roller 14 is shorter than the length of the magnetic card 4. As soon as the sensor 45 detects that the magnetic card 4 reached to the end, the motor 28 reverses its revolution, and the magnetic card 4 starts moving towards the inserting slit 5. The sensor 43 and the sensor 44 watch that the magnetic card 4 is moving from the innermost to the inserting slit 5, at the same time detect the present location of the card in order to stop revolution of the motor 28 so as the magnetic card 4 stops under the thermal print 21. And then, the solenoid 23 is put in operation to have the magnetic card 4 held between the thermal print 21 and the platen roller 24; after the card is printed with specified characters the thermal print 21 is withdrawn from the magnetic card 4, and then the motor 28 is restarted to transfer the magnetic card 4 towards the inserting slit 5; and the magnetic card 4 is discharged from the inserting slit 5.

Now in the following, a mechanism to hold the upper chassis 1a and the lower chassis 2a clamped is described.

Figure 4:
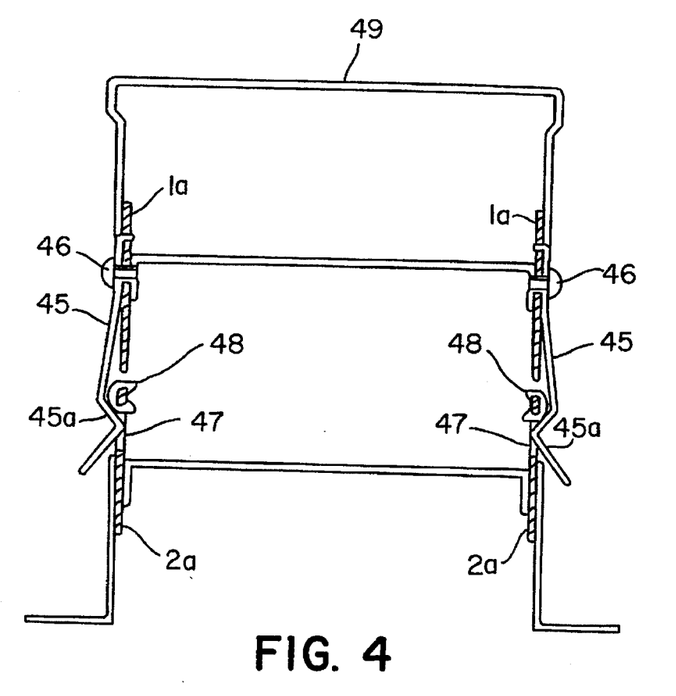
FIG. 4 illustrates the essential part of a clamping mechanism according to a first embodiment of the present invention for clamping the upper and the lower units in closed position, front view.

On both sides of the upper chassis 1a at their almost front ends, elastic arms 45 are installed. The elastic arm 45 is made with a spring wire formed into U shape, the upper opening of which is fixed with a screw 46 to the side of the upper chassis 1a.

As shown in FIG. 4, lower part of the elastic arm 45 extends to the side of the lower chassis 2a forming a bend 45a, in a shape as illustrated in the FIG., towards the side of the chassis. In the lower chassis 2a, there are openings 47 which are intended to accept the bends 45a fitting into them with elastic action to make a clamping in a detachable way. Components 48 are the covers to protect the lower chassis 2a from the elastic arms 45, and 49 is a handle fixed with screws to the upper chassis 1a at its front part.

Figure 5:
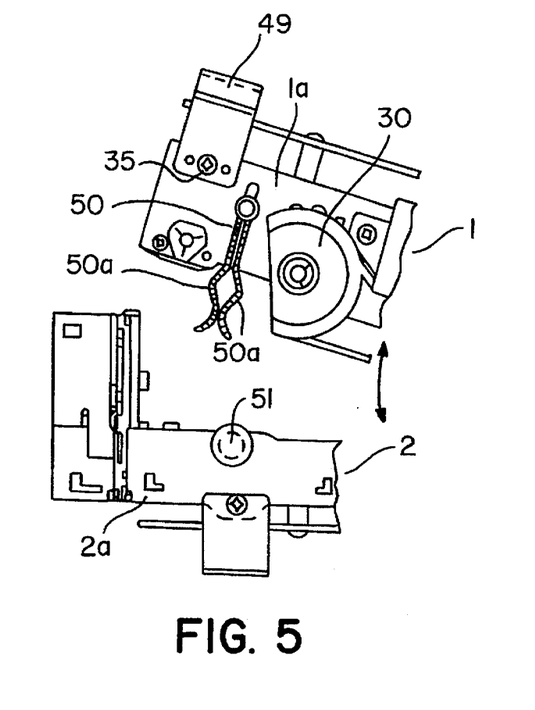
FIG. 5 illustrates the essential part of a clamping mechanism according to a second embodiment, side view.

When applying maintenance servicing or cleaning to the inside, pull the handle 49 upward, then the bend 45a escapes from the opening 47 allowing the upper chassis 1a rotate upward with the pin 3a of the hinge 3 as the centre; then, the insides of the upper chassis 1a and the lower chassis 2a are exposed open. The magnetic head 22, various rollers, the thermal print 21 and other components may be thoroughly cleaned using a cotton applicator or other cleaning tools without difficulty. When such works are finished, hold the handle 49 to press down the upper chassis 1a towards the lower chassis 2a to have the bend 45a of the elastic arm 45 elastically adapted with the opening 47; thus, the upper chassis 1a is held clamped with the lower chassis 2a. In the clamped state, the pressure rollers 15,16,17 and the magnetic head 22 of the lower chassis 2a are pressed by the driving rollers 12,13,14 and the roller 27 of the upper chassis 1a with specified force, as shown in FIG. 1(c). FIG. 5 shows side view of FIG. 5 shows side view of other holding/clamping mechanism.

Where, an elastic arm 50 is formed with a metal wire, the lower part of it has bends 50a in a fork shape designed to elastically catch, in a detachable way, a pin 51 extruding from the side of the lower chassis 2a. The ends of the bends 50a widen towards the ends for the ease of fitting with the pin 51. Thus, the bends 50a elastically catch the pin 51 in a detachable way; therefore this device also constitutes a holding/clamping mechanism.

These elastic arms 45,50 generate sufficient elastic force to firmly hold/clamp the contact edges (not shown) of upper and lower chassis. By constituting in the aforementioned structure, the close/open operation can be done with a simple work of push down/pull up of the handle 49.

In the above mentioned descriptions of the embodiments, a magnetic write/read means using magnetic head is employed for writing/reading data, however, other means such as optical read/write system or the like may of course be used to serve the same purpose. In the same token, although a thermal printing using thermal print is employed as a means of forming an image on the card, it is not limited to thermal printing, but other imaging method may of course be used.

As described in the foregoing passages, according to the present invention, a whole body is divided into two units, upper unit and lower unit, and these units are jointed with a hinge to compose a single body; a card transfer path is provided between the upper unit and the lower unit, and the upper and the lower units are made to be clamped by means of an elastic mechanism. Therefore, the maintenance servicing on rollers, heads and other components of the card transfer path, and the parts replacing work become extremely easy.

Furthermore, a limited space is efficiently utilized by installing the thermal print and the magnetic head separated in the chassis opposing to each other. Thus, the present invention makes it possible to implement an equipment that is compact in body size and easy in applying the maintenance servicing.

Although the present invention has been described in terms of the presently preferred embodiment, it is to be understood that such disclosure is not to be interpreted as limiting. Various alternations and modifications will no doubt become apparent to those skilled in the art after having read the above disclosure. Accordingly, it is intended that the appended claims be interpreted as covering all alternations and modifications as fall within the true spirit and scope of the invention.

What is claimed is:

1. A card reader/writer comprising, an upper unit, a lower unit, and a body made of the upper and lower units joined with a hinge to be freely openable/closable, said hinge being located at the end of said upper and lower units, a card transfer path provided between said upper and lower units, which is straight and almost entirely exposed when opening said upper and lower units when rotating said upper unit upward with said hinge as the center, recording/reproducing means installed in the body which conducts at least one of the actions of either recording data on or reproducing data from a card.

2. A card reader/writer in accordance with claim (1), wherein a card carrying means to transfer a card along a card transfer path is installed in the body.

3. A card reader/writer in accordance with claim (1), wherein a means to form an image on a card is installed in the body.

4. A card reader/writer in accordance with claim (3), wherein an image forming head of the image forming means is installed in a unit whereas a recording/reproducing head of the recording/reproducing means is installed in other unit opposing to the unit.

5. A card reader/writer in accordance with claim (1), wherein an elastic clamping component having bend(s) is fixed on one of the units, and a jointing component to accept said bend part of elastic clamping component is provided on the other unit, for keeping the both units clamped together when they are closed.

6. A card reader/writer in accordance with claim (1), wherein a handle for opening and closing the body is fixed on one of the units.

7. A card reader/writer comprising:

an upper unit;

a lower unit;

a body made of the upper and lower units joined with a hinge to be freely openable/closable, wherein a card transfer path is provided between said upper and lower units;

an image forming head for forming an image on a card installed in one of said units; and a recording/reproducing head for recording/reproducing data on a card installed in the other of said units, wherein each of said heads are installed in both units separately.

* * * * *

UNITED STATES PATENT AND TRADEMARK OFFICE
CERTIFICATE OF CORRECTION

PATENT NO. : 5,652,422
DATED : July 29, 1997
INVENTOR(S) : Hitoshi SHIMAOKA et al.

It is certified that error appears in the above-indentified patent and that said Letters Patent is hereby corrected as shown below:

Col. 5, line 38, after "center," insert a return (new ¶) and insert --a--.

Signed and Sealed this

Fourteenth Day of April, 1998

Attest:

BRUCE LEHMAN

Attesting Officer

Commissioner of Patents and Trademarks